(12) United States Patent
Marti Sala (10) Patent No.: US 7,134,540 B1
(45) Date of Patent: Nov. 14, 2006

(54) ADAPTABLE AUTOMATIC MACHINE FOR THE ORIENTATION AND ALIGNED SUPPLY OF LIGHTWEIGHT HOLLOW ARTICLES

(76) Inventor: Jaime Marti Sala, Calle Emancipació, 8, E-08017, Barcelona (ES)

( * ) Notice: Subject to any disclaimer, the term of this patent is extended or adjusted under 35 U.S.C. 154(b) by 0 days.

(21) Appl. No.: 10/149,500

(22) PCT Filed: Dec. 3, 1999

(86) PCT No.: PCT/ES99/00394

§ 371 (c)(1),
(2), (4) Date: Nov. 12, 2002

(87) PCT Pub. No.: WO01/40084

PCT Pub. Date: Jun. 7, 2001

(51) Int. Cl.
*B65G 29/00* (2006.01)

(52) U.S. Cl. .................................. 198/392; 198/397.02

(58) Field of Classification Search ................ 198/392, 198/400, 397.02, 397.05, 396, 391
See application file for complete search history.

(56) References Cited

U.S. PATENT DOCUMENTS

| | | | | | |
|---|---|---|---|---|---|
| 4,681,209 | A | * | 7/1987 | Marti | 198/392 |
| 4,865,181 | A | * | 9/1989 | Nalbach | 198/392 |
| 5,415,322 | A | * | 5/1995 | Sala | 198/397.05 |
| 6,065,587 | A | * | 5/2000 | Schindel | 198/392 |
| 6,302,258 | B1 | * | 10/2001 | Verona | 198/392 |
| 6,435,333 | B1 | * | 8/2002 | Sala | 198/400 |

FOREIGN PATENT DOCUMENTS

| | | |
|---|---|---|
| EP | 0 065 866 A1 | 12/1982 |
| EP | 0 849 197 A1 | 5/2000 |
| ES | 8 407 454 A | 7/1987 |
| ES | 2 066 672 | 3/1995 |
| FR | 2 682 093 | 4/1993 |
| WO | WO 99/59904 | 11/1999 |

\* cited by examiner

*Primary Examiner*—James R. Bidwell
(74) *Attorney, Agent, or Firm*—Black Lowe Graham PLLC (57) ABSTRACT

The invention relates to an adaptable automatic machine for the orientation and aligned supply of lightweight hollow articles, comprising cavities (6) delimited by front, back and lateral walls (116), an open bottom enabling the passage of articles (A), support/stop configurations for the article (A) to confer a predetermined orientation to the article as it falls through said bottom, in addition to conduits for receiving and transporting the articles (A) beneath the cavities (6). The articles are displaced together in a closed circuit, support means being placed between the bottom of each cavity (6) and each corresponding conduit for temporarily retaining the articles (A) in said cavities (6) in part of the circuit. Several of the above-mentioned support/stop configurations, walls, wall parts and/or combinations thereof (126, 136) are connected to displacement elements in such a way that they can be introduced into/taken out of the above-mentioned cavities (6) with the purpose of adapting them to different articles (A).

15 Claims, 7 Drawing Sheets

ADAPTABLE AUTOMATIC MACHINE FOR THE ORIENTATION AND ALIGNED SUPPLY OF LIGHTWEIGHT HOLLOW ARTICLES

CROSS REFERENCE TO RELATED APPLICATIONS

This application is the U.S. national stage of PCT application PCT/ES99/00394 which has an international filing date of Dec. 3, 1999 and claims priority from that PCT application.

FIELD OF THE ART

This invention relates to an automatic adaptable machine for unscrambling and delivering light hollow aligned containers such as plastic containers or bottles, which is specially designed for feeding said articles to filling lines.

The function of this type of machine is taking containers from a location where said containers are grouped in a scrambled arrangement, and randomly oriented and delivering them at an outlet, one by one, in an aligned row and arranged according to a predetermined orientation which, generally, and namely in the case of containers designed to be filled, is neck up, i.e., with a bottom of the article resting on the plane and an open end or neck facing upwards, from an outlet. Typically, the articles are taken from the outlet, for example by a conveyor or a filling line keeping their arrangement and orientation.

BACKGROUND OF THE INVENTION

In the state of the art, several machines are known which comprise means for taking said articles from a location where they are piled up in a scrambled arrangement and to individually deposit them in a lying position in a plurality of bottomless cavities secured on a structure travelling along a closed circuit above a supporting stationary plane. Said cavities have a such a configuration that within them the articles may only remain oriented with a given end either facing the cavity front part or back part, with respect to the direction of said travel. Thus the articles are driven inside the cavity, impelled by walls which delimit them, sliding supported on said supporting plane, to an unloading location where the supporting plane has an interruption defining an empty space through which the articles fall by gravity, being transferred from the cavities to chutes, each of which is located under a respective cavity, travelling together with it. Within each cavity there are means to support said given end of the article depending on the orientation of said article within the cavity so that when arriving to said interruption of the supporting plane, the article will always start to fall by the opposite non supported end, the article remaining within the chute with the given end facing upwards, from where it is delivered at an outlet.

European Patent EP-A-0 065 866 discloses a machine of this type with a receptacle adapted for loading said containers in bulk, with a rotatory disk which has peripheral openings defining article receiving cavities delimited by radial appendages so that each appendage limits by one side a cavity back part (in the travelling direction) and the by the other the front part of the following one. In this machine, said means to support a given end of the container (typically the bottleneck) depending on its orientation within the peripheral cavities consist in supports defined in two radial appendages which delimit it and comprising a specific configuration according to the container dimensions and the travelling direction, as because due to the inertial and frictional forces, the containers always tend to rest against the radial appendage of the back part. Therefore, the front part appendage comprises a simple support for said bottleneck while the appendage of the back part comprises a support for the bottleneck and in addition a stop configuration for the container bottom, so that when the recipient is oriented with the bottleneck facing toward the front part, said container bottleneck remains located on said support of the front part because its bottom is resting against said stop configuration and when the container is oriented with the bottleneck facing toward the back part, said container bottleneck remains resting against the back appendage and located on said support of the back part, because the stop configuration is designed to interfere only with the bottom and not with the bottleneck. Thus, when arriving at the area where the supporting plane is interrupted, the bottleneck always remain for a moment supported by said supports, regardless of the container orientation within the cavity, favouring that the fall always starts by the bottom so that the container remains within the chute with the bottleneck up.

This arrangement, although fully effective, shows the drawback that it requires very accurate shapes and dimensions for the cavities, supports and stop configurations depending on the shapes and dimensions of the type of containers to which they are designed. This means that the machine is only adapted for a single type of containers for which it was accurately designed unless it is proceeded to a slow and elaborate manual repositioning or replacement of each individual element.

U.S. Pat. No. 4,681,209 by the same applicant of this invention discloses a machine of this type in which there exists radial parts which show on one side, a front appendage and on the other side, a back appendage, the cavities remaining formed between two of said parts, said parts may be socketed on the machine moving structure, therefore they may very easily and quickly be replaced. Also, in said machine, the chutes are provided with snap-fit means therefore they are also easy to replace.

With this arrangement, a longitudinal matching to the heights of different types of containers in a relatively quick operation is achieved but it has the drawback that it has no transversal regulation available within the cavities for matching to containers having different widths.

The application of the French patent FR-A-91 12 375 by the same applicant of this invention, discloses an unscrambling machine of this type, having peripheral cavities delimited by radial appendages in which all the compartment front appendages are secured on a first circular structure while all the back appendages are secured on a second circular structure coaxially secured on the first the relative angular position of the second structure with respect to the first may be regulated, simultaneously adjusting this way the longitudinal distance between the front and the back appendages in all the compartments. For the chutes, said application of French Patent FR-A-91 12 375 adopts an analogous solution.

This solution shows a significant improvement with respect to said Patent EP-A-065866, however it still does not provide a solution to the problem of regulating as well the compartments as the chutes transversal spread.

On its side, in the application of Patent EP-0 578 602-BI by the same applicant of this invention, a machine of this type is disclosed in which the cavities are formed by a series of individual frame-like hollow bodies, and the chutes in an analogous way, the ones and the others may be socketed on the periphery of said rotatory structure so that as well the compartments as the chutes are very easily and quickly replaced, without tools being required, which allows to adapt the machine to different types of containers through the arrangement of a set of compartments and chutes for each type of container to be used.

The solution to the compartments and chutes replacement has the advantage to provide, in an easy and quick operation, matching in the very best way each type of container in the three dimensions of the space. However, this system requires the manufacture and storage of a great number of compartments and chutes which means a high economic cost.

Eventually, the application of patent PCT/ES 98/00143, by the same applicant of this invention proposes a machine of this type in which the cavities are formed by frame-like hollow bodies secured on a first rotatory structure, in a front part of each an elongated member is transversally arranged, which has an adjustable length acting as the container bottleneck support. All said elongated members are secured on a second circular structure coaxially secured on the first structure, the relative angular position of the second structure with respect to the first structure may be regulated, so that the longitudinal position of all the elongated members within their respective cavities is simultaneously regulated in a single operation. One of the side walls of each compartment is moveable; its position within it may be transversally regulated. Said transversal regulation of the length of every and all the elongated elements and/or the position of every and all the moving side walls can be carried out and can be jointly and simultaneously secured in a simple operation.

The chutes are formed by a front wall, a side wall and a back wall, leaving one open face that is delimited by the wall of a fixed housing. Every and all said chute back walls are connected to said first structure while every and all the front walls are connected to a third structure, moveable with respect to the first structure, the relative position between the first and the third structure may be connected in a position wished, obtaining thus a simultaneous matching of all the chutes to the width of a given type of container. Said chute side walls are transversally moveable and have an adjustable position.

Although this arrangement was found to be fully effective, it has the drawback that it requires multiple coaxial structures with angular positions adjustable to each other which means a relatively great complexity of the machine and a high weigh of the rotatory parts, which can carry problems associated to the centrifugal and inertial forces.

DISCLOSURE OF THE INVENTION

Therefore an object of this invention is to provide an machine of above mentioned type provided with means which allow to adapt said cavities and chutes of the different members of a range of types of containers by means of quick and simple automated operations.

In fact, there is a trend nowadays to apply the productions techniques called "just in time" or of tailored production, which makes advisable to adjust at every moment the production of each article to the actual and firm demand available. This allows to cut down to the minimum the stocks or amounts of parts, components and manufactured products stored for the event orders referring to them are received and this limits the requirement to apply techniques of demand forecast.

This technique of production upon order, applied for example to the packaging and/or bottling sector, implies to have available machines for unscrambling and delivering light hollow aligned containers, such as plastic bottles, which may be adapted in a virtually instant way to different types of containers as many times as it is required during a working day, which is often of 24 hours distributed in several shifts for the workers.

For example, a filling line for a soft drink which is marketed in 2 l, 1.5 l, 1 liter, ½ liter and ⅓ liter plastic bottles ought to have available a machine for unscrambling and delivering empty bottles for each size of bottle, or a machine which can change some of its dimensions characteristics to be selectively adapted to any of these five sizes of bottles. For this reason, the trend is to contribute with machines capable to sustain said adaptations. However, in the adjustable machines, which appeared up to now, said adaptation requires a given time, which means to stop the production line, which is the cause of an economic loss.

Therefore, the essential object of the invention is not to contribute with a machine having an adjusting capacity to adapt itself to different types of articles or packages, such as those existing in above mentioned state of the art, but a machine having the capacity to adapt itself very quickly in a virtually instant way to the dimensions of any member of a range or limited number of articles, having different known dimensions.

This object is achieved in an automatic adaptable machine for unscrambling and delivering, light hollow aligned articles such as bottles made of plastic material, according to the invention, having available means for collecting said articles which define cavities, in each of which several supporting planes or walls or parts of walls, or combinations thereof are available, guided and joined to shifting elements so that they may be introduced into or withdrawn from said cavity recomposing the internal space thereof depending on the dimensions and shapes of a range of products to be unscrambled. Under each cavity there is a chute collecting and carrying the articles which comprises two parts which may be drawn nearer or moved away to be adapted to a thickness or diameter of the article which has access to them, at least one of said parts being guided and joined to shifting elements. In said machine, every guiding and shifting element is acting linearly and is driven by fluid-dynamic means, through rotatory motors or electromechanical elements of linear action.

In an example of embodiment, the machine includes means in order that driving said shifting elements occurs simultaneously in every cavity and/or chute, upon a manual or automatic command. In another example of embodiment, the machine includes means for driving shifting elements corresponding to one or more supporting planes, walls, parts of walls or combinations of both, occurs in a selective way, depending on the characteristics and/or the position of the article received in a cavity sensed by detecting means. Either example of embodiment, said means are typically a valve, motor and/or electromechanical devices control circuitry, preferably programmable for example by a PLC.

In a preferred embodiment, the general structure of the machine comprises a receptacle adapted for loading said articles in bulk with a side wall and a circular bottom on which the articles are accumulated, the bottom of which has a peripheral portion at a distance from said side wall defining an annular space through which the articles may pass. Under said circular bottom, there is a structure, rotatory about an upright or inclined axis, which has a circular periphery to which collecting means are associated which define said cavities, which are longitudinally arranged under said passage space for collecting said articles, chutes are also joined to said structure.

In an example of embodiment of the invention, said collecting means comprise first frame-like hollow bodies, secured on said structure periphery which define first cavities adapted to collect a first type of articles, and further frame-like or part frame-like hollow bodies which define respective cavities adapted to collect further types of articles having generally decreasing dimensions, said further bodies being guided in radial direction and joined to shifting elements so that said bodies adapted to articles having smaller dimensions may be introduced into or withdrawn from the cavities of said bodies adapted to articles having bigger sizes.

In another example of embodiment of the invention, the machine comprises collecting means which define said cavities and in which each cavity comprises a supporting plane close to a front wall, a transversally laterally moving wall having a stop configuration close to a back wall and several retractable supporting members which may be transversally introduced into or withdrawn from the cavity in order of adapting, in co-operation with the position of said moving wall, said cavities to characteristics of size and/or shape of a range of articles having decreasing dimensions.

According to another feature of the invention, each cavity comprises a stop, at the back part thereof, located at a suitable height for articles having a given width, under said stop there is arranged a retractable stop member, uprightly moveable, which may be transversally introduced into or withdrawn from said cavity to adapt it to articles having smaller widths.

According to another feature of the invention, the machine comprises a system for detecting the position in which an article is located within each cavity, a retractable supporting member arranged at the front part of each cavity and control means which may command the drive of said supporting member in order it is transversally introduced into or withdrawn from said front part of the cavity depending on a signal received from said detection system referring to said position of the article detected.

According to another feature, the invention proposes to adapt the cavities to articles having a range of different sizes by partitioning the cavities so that the machine productivity is multiplied. For this, each cavity comprises a first supporting member arranged at the front part and a first stop member arranged at the back part, which are adapted for articles having given dimensions. The cavity in addition comprises a transversally moving side wall with at least a passage opening for at least one retractable partitioning member, which may transversally enter in said cavity to divide it in at least two equal parts. To complete the adaptation, a further retractable supporting member has been arranged close to the back side of each partitioning member and a further retractable stop member close to the front side of each partitioning member so that by introducing said partitioning member, the further supporting members and further stop members, and suitably repositioning the side wall, each of said equal parts are adapted for articles having significantly smaller dimensions.

In an alternate arrangement of the partitioning system, each cavity comprises a first retractable supporting member arranged at a front part and a first system detecting the position of the articles within the cavity arranged at the back part, adapted for articles having given dimensions, comprising in addition a transversally moving side wall with at least a passage opening for at least a member of retractable partitioning, which may transversally enter in said cavity to divide it at least in two equal parts, and a further retractable supporting member close to each partitioning member and a further system for detecting the position close to the front part of each partitioning member so that with the introduction of said partitioning members, said further supporting members and further detecting systems and by repositioning the side wall, each of said equal parts are adapted for articles having significantly smaller dimensions.

It is obvious that partitioning the cavities must be accompanied by same chutes partitioning. For this, each chute is adapted to collect articles having given dimensions and comprises at least a retractable partitioning member, which may transversally enter in said chute through an opening on the side wall, dividing the chute in at least two equal parts adapted to receive articles having smaller dimensions.

Generally a single partitioning member is available so that each related cavity and chute is divided into two equal parts, duplicating so the machine production. However, the related cavity and chute can be divided, for example, in three or four equal parts by means of two or three partitioning members, but in these cases, the jump in the order of size magnitude of the articles to be handled before and after partitioning is very significant.

The detecting systems above mentioned in different examples of embodiment preferably comprise optical sensors or visualization devices covering an area or field close to a back part of the cavity, or the part resulting from the partition thereof.

Said characteristics and variations allow that the machine of the invention possesses a capacity to adapt itself in a virtually instant way to the dimensions of any member of a range or a limited number of articles, having different known dimensions.

BRIEF DESCRIPTION OF THE DRAWINGS

This invention will be best understood from the detailed description below of exemplary embodiment thereof, with reference to the accompanying drawings, in which.

DETAILED DESCRIPTION OF SOME EXEMPLARY EMBODIMENT

It is proceeded thereafter to a detailed description of very concrete parts of an automatic, adaptable machine for unscrambling and delivering hollow light aligned articles, such as plastic bottles, which constitute the essential part of this invention according to some examples of preferred embodiments. However, the whole machine has not been illustrated because its general structure is well-known in the art of the sector. Therefore, a short general description thereof is provided for best understanding the reliability of the concretely illustrated parts.

So, the machine of this invention comprises a receptacle adapted to load in bulk articles A, B, C, for example plastic bottles, said receptacle having a side wall and a circular bottom on which said articles A, B, C are accumulated, the bottom of which has a peripheral portion at a distance from said side wall defining an annular space through which articles A, B, C can pass collecting means been arranged under said passage space to collect said articles A, B, C. Said collecting means define bottomless cavities 6, 60, arranged longitudinally at a circular periphery of a structure 7, which rotates with respect to an upright or inclined axis, to said structure 7 chutes 8, 80 are also connected to collect articles A, B, C when they fall and carry them in upright position. The cavities 6, 60 have such a configuration that articles A, B, C may only remain within them oriented in lying position with a given end (for example a neck or opening) either facing a cavity front or back part, with respect to the direction of said travel. Each chute 8, 80 is associated or eventually joined to one of cavities 6, 60 and arranged under the open bottom thereof, so that they are driven together through structure 7 along a closed circuit, in this case a circular path constituted by each revolution of said structure 7. Between said opening at the bottom on each cavity 6, 60 and each respective chute 8, 80, supporting means are interposed for temporarily retaining articles A, B, C in said cavities 6, 60 along a part of the path of said closed circuit. Said supporting means are interrupted at a portion of said path to let the articles (A, B, C) fall in respective chutes 8, 80. The cavities 6, 60 are delimited by front and back walls 6a, 60a, 116a, 6b, 60b, 116b, 62 in the direction of the travel and by side walls 6c, 60c, 116d, 126d, 136c, 136d and they comprise supporting and stop configurations 11, 11a, 11c, 20, 51, 54, 61, 63, 67, 68, 111, 121, 131 of different parts of the article A, B, C co-operating to confer an upright orientation, with a predetermined direction, to the article A, B, C when it falls through said opening of the bottom of cavities 6, 60.

It has to be pointed out that said supporting means have not been represented in any of the figures which illustrate this description as they are well-known in the art of the sector and can consist in an annular stationary supporting plane provided with an interruption at a strategically determined area or at a gate individually associated to the open bottom of each cavity provided with means to be opened at said strategically determined area, as it is disclosed in said patent PCT/ES 98/00143, of the applicant of this invention.

Figure 1:
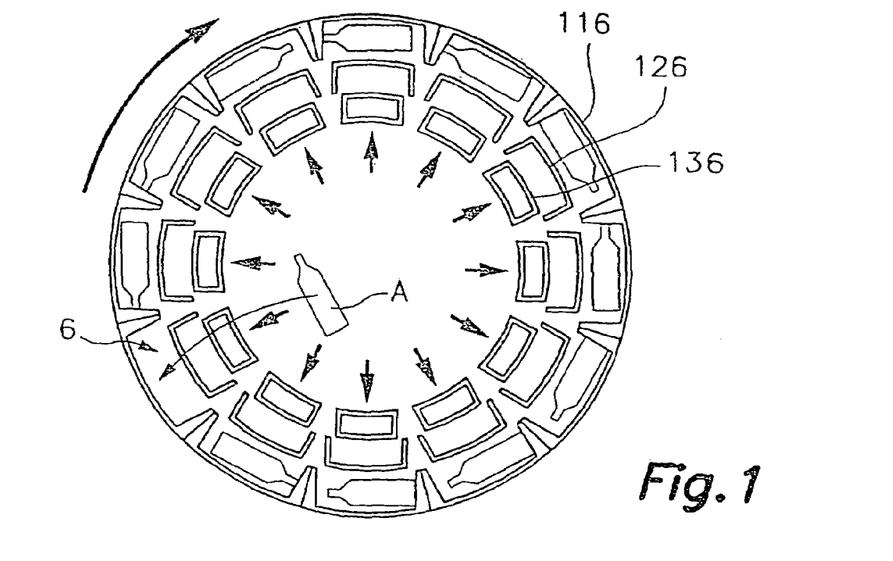
FIGS. 1 and 2 are elevation views which illustrate two alternate arrangements of several sets of frame-like hollow bodies which define cavities adapted to different members of a range of articles having decreasing dimensions, said hollow bodies may be introduced each inside another.
Figure 2:
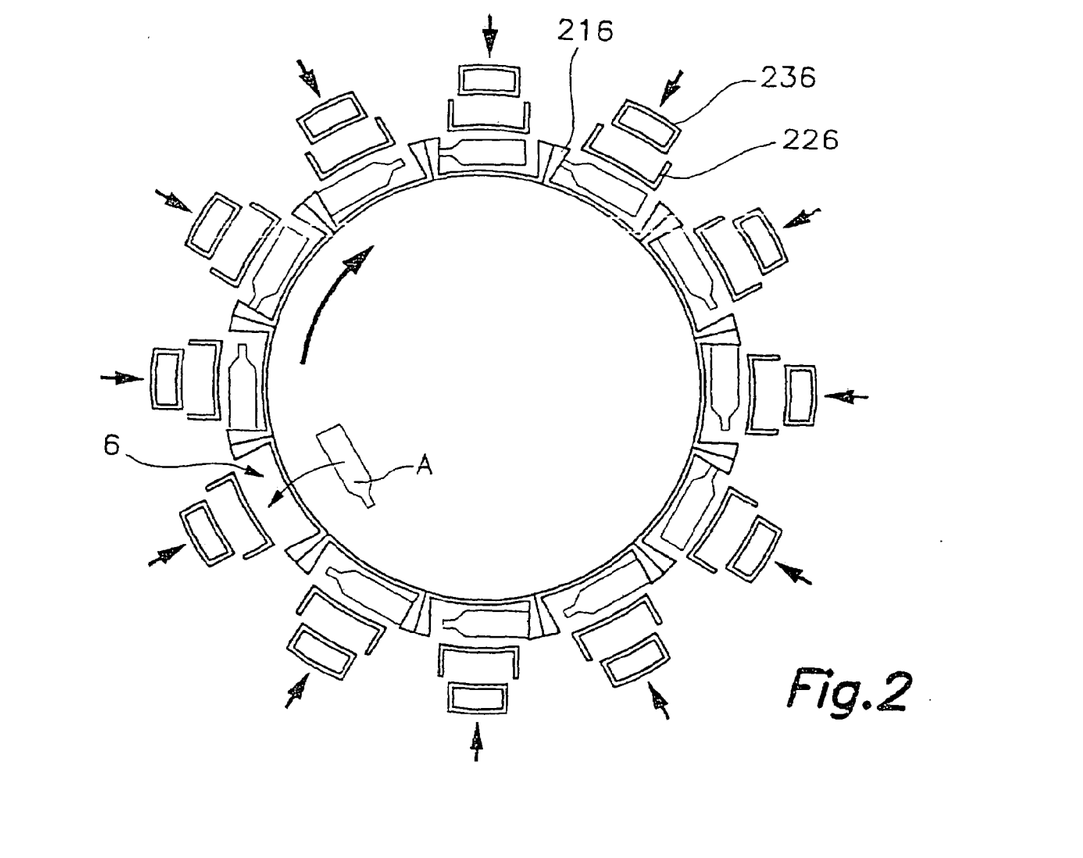

Referring now to FIGS. 1 and 2, frame-like or part frame-like first hollow bodies 116, 216 are secured on said periphery of the structure 7 (not illustrated in FIGS. 1 and 2) which define first cavities 6 adapted to collect a first type of article A. Cavities 6 are arranged under said receptacle circular bottom annular space through which articles A, B, C can pass. Further hollow bodies 126, 136, 226, 236, respectively adapted to collect articles B, C having decreasing sizes are arranged adjacent to each hollow body 116, 216 and may be introduced into or withdrawn from it. In the example illustrated in FIG. 1, the hollow bodies 116 have an open internal side so that the further hollow bodies 126, 136 are introduced from inside outwardly the structure in a radial direction illustrated by respective arrows. On the contrary, in the example illustrated in FIG. 2, the hollow bodies 216 have an open external side so that the further hollow bodies 226, 236 are introduced from outside inwardly the structure, in a radial direction, also illustrated by respective arrows.

In FIGS. 1 and 2, it is also shown how articles A, which have been illustrated as plastic bottles, remain randomly arranged within the cavities 6 oriented with a given end, for example a bottleneck, facing a front or a back part of said cavities 6 with respect to the travel direction indicated by an external curvilinear arrow. Because of the inertial and the frictional forces, said articles tend to remain resting on a wall or a supporting or stop configuration located at said back part.

Figure 3:
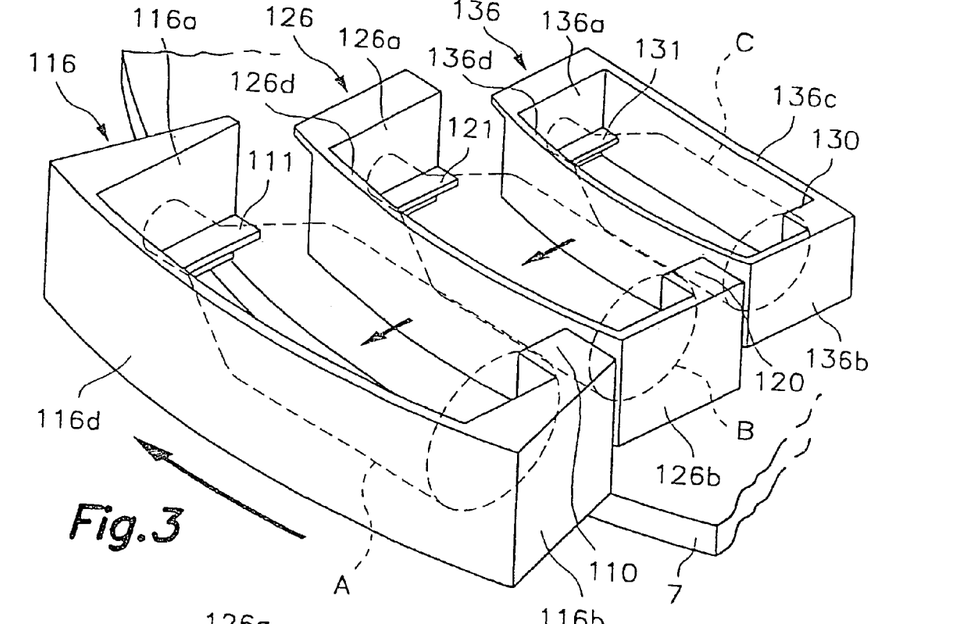
FIG. 3 is a view in top perspective which illustrates with more details a set of frame-like hollow bodies of the arrangement of the FIG. 1 before they are introduced each inside another.
Figure 4:
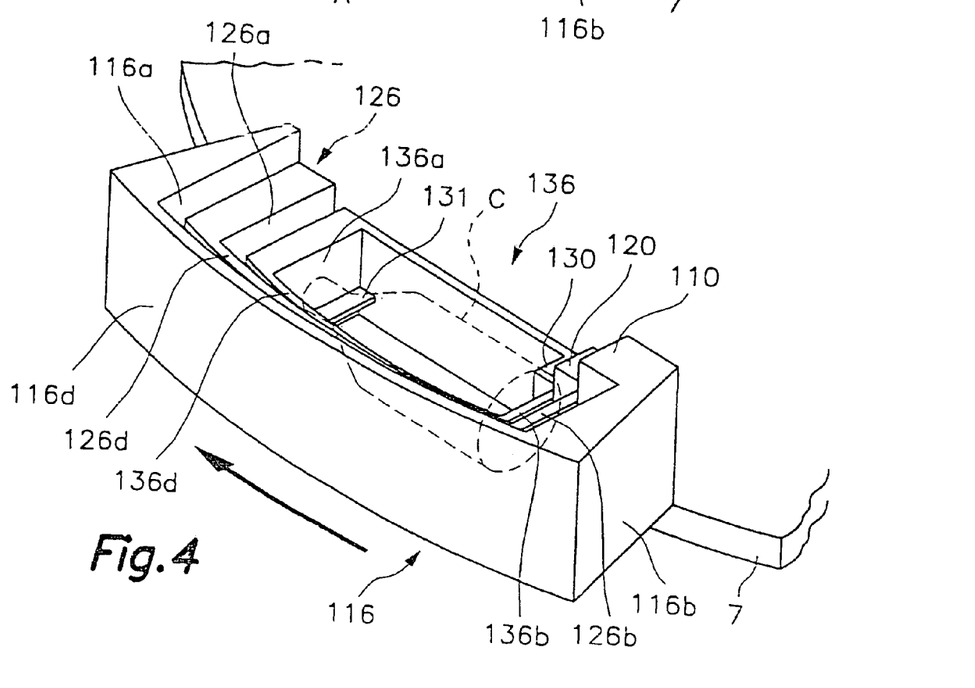
FIG. 4 is a view in top perspective which illustrates the arrangement of frame-like hollow bodies of the arrangement of FIG. 1 once they are introduced each inside another.

The operation of the arrangement of FIG. 1 is shown with more details in FIGS. 3 and 4, in which and to best simplify the drawing, only one of said sets formed by a first hollow body 116 and further hollow bodies 126, 136 have been shown.

Thus, in FIG. 3, a hollow body 116, adapted to the dimensions of a first article A is secured to the periphery of said structure 7. Adjacent to an internal side of said hollow body 116 there are further frame-like or part frame-like hollow bodies 126, 136 which define respective cavities 6 adapted to collect further types of articles B, C having generally decreasing dimensions. Said further bodies 126, 136 are moveable and are guided and joined to shifting elements (not shown) so that said hollow bodies 126, 136 adapted to articles B, C having smaller dimensions may be introduced into or withdrawn from the cavity 6 of said bodies 116, 126, adapted to articles A, B having larger sizes. As it has been said above, in principle only the hollow bodies 116 are arranged under the annular space through which articles A, B, C coming from the receptacle which contains them loaded at bulk can pass while the further hollow bodies 126, 136 are brought back inwardly the structure 7, under said receptacle bottom (not shown) of articles A, B, C at bulk.

In an example of embodiment shown in FIGS. 3 and 4, each hollow body 116, 126, 136 includes a front wall 116a, 126a, 136a having a front supporting configuration 111, 121, 131, a back wall 116b, 126b, 136b having a back supporting and/or stop configuration 110, 120, 130, and an external wall 116d, 126d, 136d. Only the hollow bodies 136 adapted to articles C having smaller dimensions have incorporated internal walls 136c. On the contrary, in those hollow bodies 116, 126, adapted to articles A, B having larger dimensions, the functions of the internal wall are respectively carried out by the external walls 126d, 136d of those bodies 126, 136 adapted to articles B, C having smaller dimensions.

Thus, making the machine operating with the further hollow bodies 126, 136, adapted to articles B, C having smaller dimensions, brought back inwardly the structure 7 (situation illustrated in FIG. 1), the device is adapted to handle articles A having larger dimensions. If the hollow bodies 126 adapted to articles A are introduced in the cavities of the hollow bodies 116, adapted to articles A, keeping the hollow bodies 136 adapted to articles C (a situation not shown) brought back, said hollow bodies 126 remain arranged under said annular passage space of the articles coming from the receptacle at bulk, so that the device is adapted to handle articles B having intermediate dimensions. Eventually, with the introduction of hollow bodies 136, adapted to articles C, into the cavities of the hollow bodies 126, keeping them inside the cavities of the hollow bodies 116 (situation illustrated in FIG. 2), the further hollow bodies 136 remain under said annular passage space so that the device is adapted to handle articles C having smaller dimensions.

It has to be pointed out that when both hollow bodies 126, 136 are brought back inwardly the structure 7, they may advantageously remain arranged with the second ones being inside the first ones, significantly saving space. The guides of the hollow bodies 126, 136 are typically linear guides and the shifting elements which drive them may be any linear operating device such as fluid-dynamic cylinders, motor and endless screw mechanisms, motor and rack mechanisms, electromagnet devices and the like.

It is obvious that, by means of a suitable valve, motor and/or electromechanical means control system, the machine adaptation manoeuvres from one to another type of articles can be carried out in a virtually instant way upon a manual or automatic command.

Figure 5:
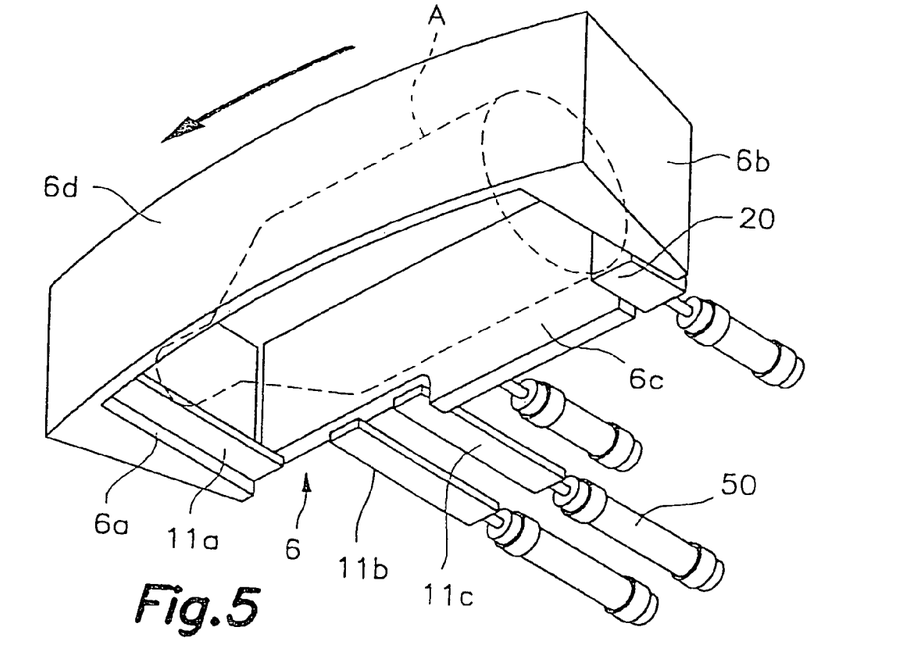
FIGS. 5 to 7 are bottom perspective views which illustrate a hollow body which defines a cavity which adapts itself respectively to three articles having decreasing sizes from a range of article by means of different supporting members and/or parts of walls which are introduced into or withdrawn from said cavity.
Figure 6:
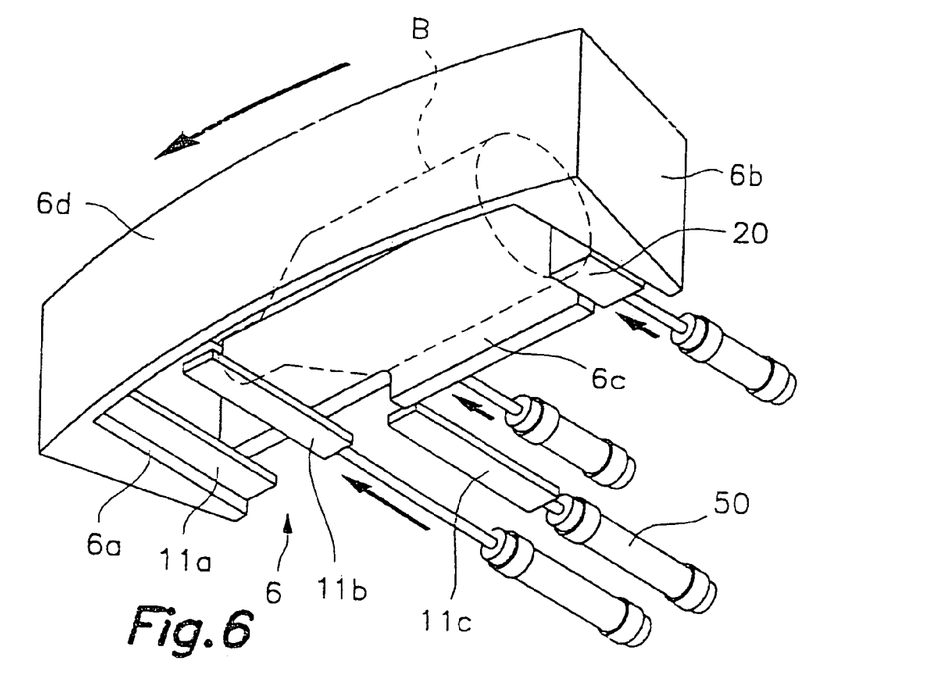
Figure 7:
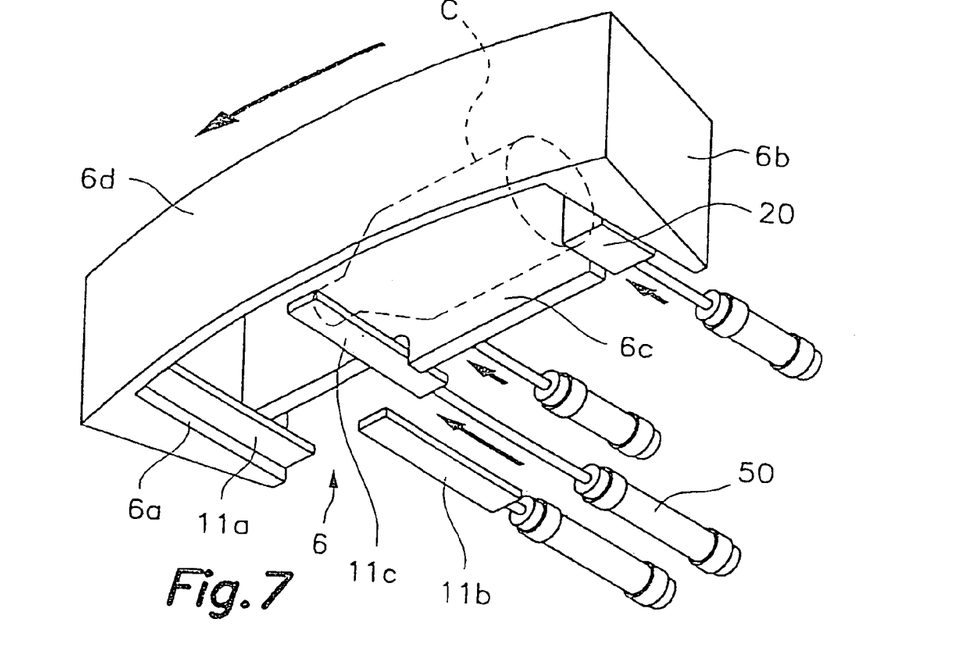

Referring now to FIGS. 5 to 7, a series of hollow bodies are arranged on said periphery of structure 7 (not shown in FIGS. 5 to 7), each of which define a cavity 6 which comprises a supporting configuration 11 close to a front wall 6a, a moving side wall 6c, a stop configuration 20 (eventually integral with said moving side wall 6c) close to a back wall 6b, and several retractable supporting members 11b, 11c, eventually guided, which may be transversally introduced into or withdrawn from the cavity 6, driven by means of shifting elements such as fluid-dynamic cylinders. Said retractable supporting members 11b, 11c operate in co-operation with the position of said moving wall 6c, the stop configuration 20 and the structure 7 rotatory direction, indicated by an arrow in the figures to adapt said cavity to a range of articles A, B, C having decreasing dimensions.

Thus, in FIG. 5 a situation is shown in which both supporting members 11b, 11c are retracted inwardly the structure 7 while the moving side wall 6c is in a position more far away from an external side wall 6d, so that the cavity 6 is adapted to articles A having given larger dimensions. It has to be pointed out that, although that in the figures the external side wall has been shown as forming part of the hollow body which defines the cavity 6, said wall could be formed by a stationary wrapping wall, separated from the front and back walls 6a, 6b, with equivalent effectiveness.

In said FIG. 5, article A has been illustrated with dot lines of article A arranged within the cavity 6 with a larger end, such as a bottom resting against the stop configuration 20, because of the inertial and frictional forces produced by the rotation in the direction indicated by said arrow, so that a narrower area of said article, such as a bottleneck, remain located above the supporting configuration 11a close to the front wall 6a. If the article A had randomly remained arranged in an opposite direction within the cavity 6 (a situation not shown), said narrower end or bottleneck, would not touch the stop 20 but would remain directly resting against the back wall 6b, so that the whole article would be in a more back position out of the supporting configuration 11a length close to the front wall 6a, and therefore without possibility of being supported by it at the moment of fall.

In FIG. 6, the supporting configuration 11b is transversally introduced within the cavity 6, while the moving side wall 6c and the stop configuration 20 has made an approximating step toward said opposite external wall 6d, to adjust said cavity to articles B having given smaller dimensions. As an example of FIG. 5, because of the speed of the rotation in the direction indicated by the arrow, the article B tends to be located at the back part of the cavity 6, either with a larger end supported on the stop configuration 20 and a narrower end on the supporting configuration 11b or with said narrower end supported against the back wall 6b and said larger end out of the length of the supporting configuration 11b.

In FIG. 7 the supporting configuration 11c is illustrated which is transversally introduced within the cavity 6 while the moving side wall 6c and the stop configuration 20 made a second approximating step toward said opposite external wall 6d, to adjust said cavity to articles C having given even smaller dimensions. Also in this case, the article C tends to be located, because of the speed of the rotation in the direction indicated by the arrow, at the back part of the cavity 6, either with a larger end supported on the stop configuration 20 and a narrower end on the stop configuration 11b or with said narrower end resting against the back wall 6b and said larger end outside the supporting configuration 11b.

In this example of embodiment of FIGS. 5 to 7, it is also obvious that, by means of a suitable valves, motors and/or electromagnets control system, the manoeuvres to be carried out to adapt the machine from a kind of articles to another kind of articles can be carried out in a virtually instant way, upon a simple manual or automatic command, for example, from a small wheel having an auxiliary scale of sizes. The articles have been illustrated as bottles having a decreasing scale of similar dimensions, but they can be articles other than bottles and even different to each other, and it is sufficient to have available a supporting or stop configuration, walls, parts of walls or combinations thereof, and their motions, suitable, specifically designed for said articles in particular.

A variation not illustrated of the moving stop configuration 20 comprises a fixed stop at the back part of each cavity 6, located at a suitable height for articles A having a given width, a retractable uprightly moving stop member being arranged under said fixed stop which may be transversally introduced into or withdrawn from said cavity 6 to adapt it to narrower articles B, C.

Figure 8:
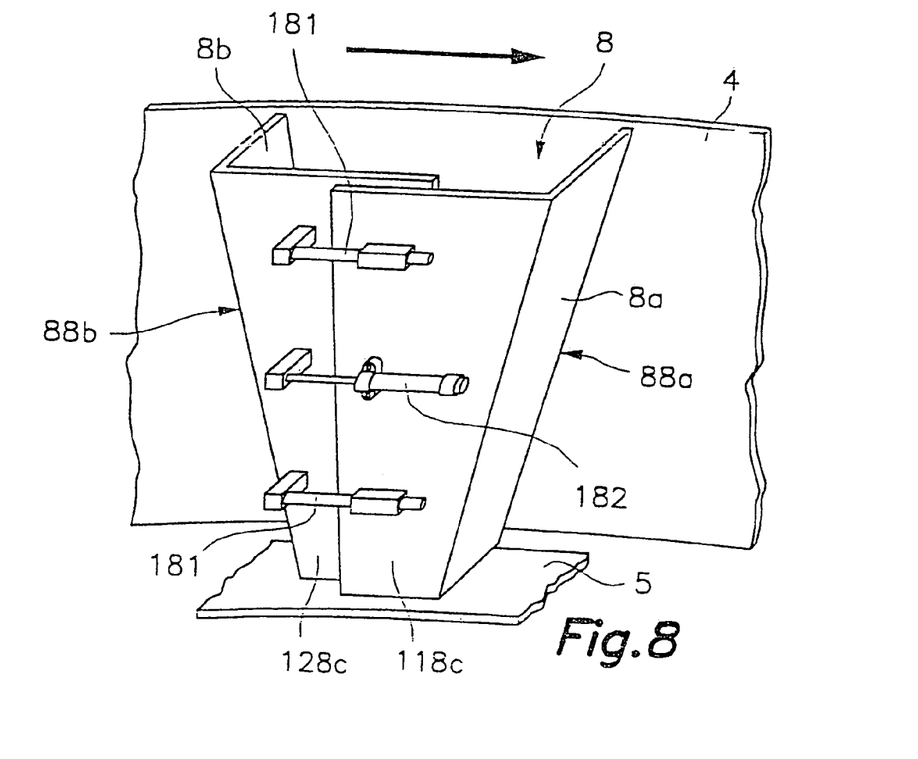
FIG. 8 is a back perspective view which illustrates a duct for collecting when they fall and carrying the articles formed of two parts with means to vary their mutual relative position.

Referring now to FIG. 8, one of the chutes 8 is illustrated to collect in their fall and carry articles A, B, C having decreasing sizes. Said chute 8 comprises a first and second part 88a, 88b which may mutually come closer or far away to adapt said chute 8 to a width or diameter of the article A, B, C which have access to it. In the example illustrated, said first part 88a comprises a front wall 8a (in the direction of the travel indicated by an arrow) and an internal side wall 118c, while said second part 88b comprises a back wall 8b and an internal side wall 128c, complementary. The functions of the external side wall is exercised by a wrapping stationary wall 4 separated from parts 88a, 88b, while the bottom of the chute 8 is open and located on a stationary supporting plane 5, on which articles A, B, C are supported and slide. Typically, one of the first or second parts 88a or 88b are secured to the structure 7 (not shown in FIG. 6) while the other of said parts 88a or 88b are guided with respect to the first part 88a by means of linear guiding elements 181 and joined to one or more linear shifting elements, such as a fluid-dynamic cylinder 182 or similar device such as a motor and endless screw mechanism, motor and rack, electromagnet and others. Thus, chutes 8 may adopt different configurations to adapt themselves to the dimensions of a range of articles A, B, C. With the arrangement of suitable control means, this arrangement may be carried out in a virtually instant way, of cavities 6 according to the examples illustrated in FIGS. 3 and 4 and FIGS. 5 to 7. In an example of alternate embodiment, a part of said chute 8 could be integral with a related hollow body 6.

Figure 9:
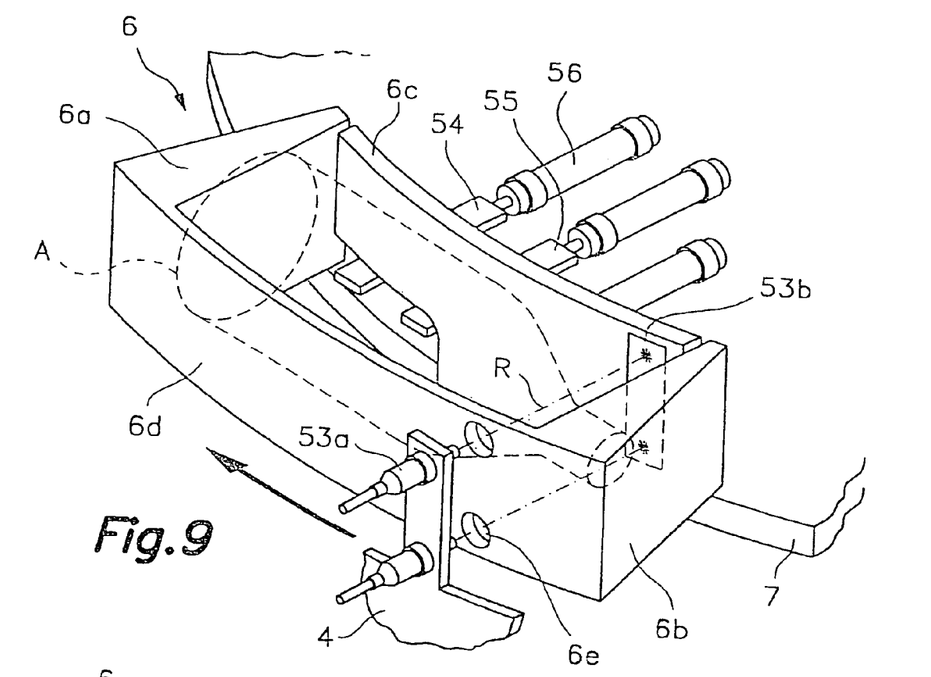
FIGS. 9 and 10 are top perspective views which illustrate a hollow body which defines a cavity with means for detecting the position of an article within it and supporting configurations which are retractable depending on said position.
Figure 10:
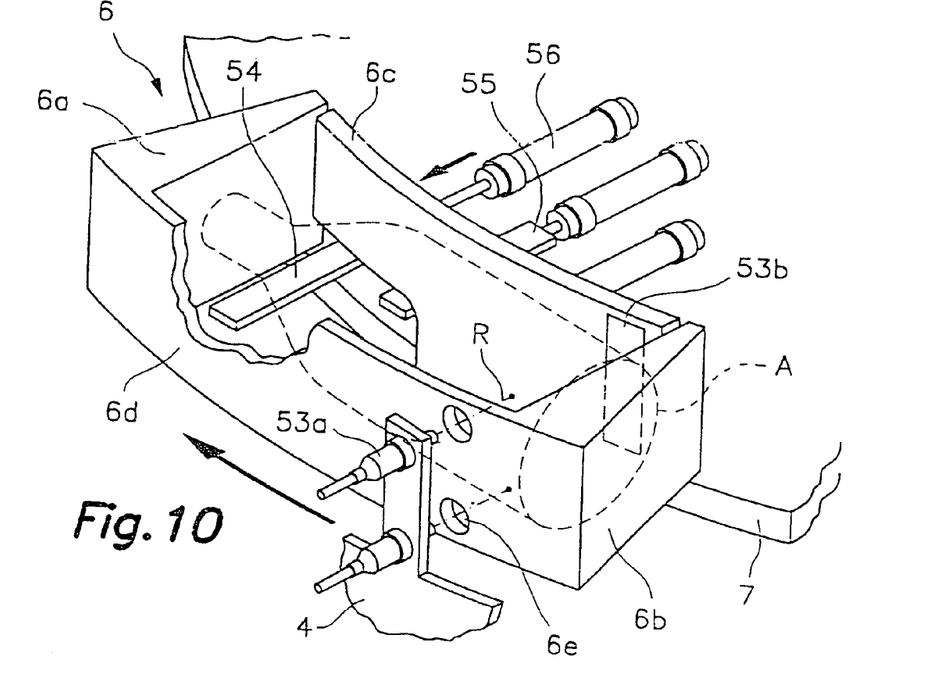

Referring now to FIGS. 9 and 10, a rotatory structure 7 is shown in the periphery of which cavities 6 are arranged (which only one has been illustrated to best clarify the drawing). Each cavity 6 is delimited by front and back walls 6a, 6b, with respect to the direction of the travel indicated by an arrow, a side external wall 6d and an internal moving side wall 6c. The cavity 6 comprises in addition first and second retractable supporting members 54, 5, arranged on the front part, and a system for detecting the position of the articles within the cavity, arranged at the back part. Said first and second supporting members 54, 55 are prepared, together with a change of position of said moving side wall 6c, to adapt the cavity 6 configuration to two different types of articles A, B although in same way further supporting members could be arranged for further articles. For following explanation purpose, it will be only referred to the first supporting member 54 and to a first position of the moving side wall 6c adapted for a first article A, because for the further types of articles the operation is analogous. The first and second supporting members 54, 55, as well as the moving side wall 6c are associated to the structure 7 through shifting elements such as fluid-dynamic cylinders 56.

Said detecting system comprises, in the example illustrated, one or more emitting/receiving optic sensors 53a fixed at a stationary position, for example a wrapping wall 4, directed in a direction which may be coincident with one or more openings 6e of said external side wall 6d of the cavity 6, so that when the cavity 6 is passing in front of said optic sensors 53a said coincidence occurs and at that moment one or more R optic rays cover an area or field close to a back part of the cavity 60. At a back area of the moving side wall 6c there is a reflecting surface 53b, in a position facing said openings 6c of the external side wall 6d, which may reflect the R optic rays so that they may be captured back by the sensors 53a, in which case they release a signal towards control means which direct said supporting member 54 performance.

Thus, in FIG. 9 a situation has been illustrated in which an article A remains within a cavity 6 randomly arranged with a narrower end, such as a neck, resting against the back wall 6b. In this case, because of the sensors 53a strategic position, when a coincidence occurs of them with the openings 6e, the R optic rays are not intercepted by the article therefore they are reflected by the reflecting surface 53b back to the sensors 53a which release a signal toward said control means, which direct that the supporting member 54 remains retracted, out of the cavity 6, so that when said cavity 6 reaches said area in which the lower supporting plane is interrupted, the article A will start to fall through the open bottom of the cavity 6 by the larger end or bottom, located at the front part.

On the contrary, in FIG. 10 a situation has been illustrated in which an article A remained within the cavity 6 randomly arranged with a narrower end, such as a neck, close to the front wall 6a and a larger part or bottom supported against the back wall 6b. Now, when the coincidence of the sensors 53a with openings 6e occurs, the R optic rays are intercepted by the article A therefore they are not reflected by the reflecting surface 53b back to the sensors 53a. In this case, no signal is released, so that the control means direct that the supporting member 54 is transversally introduced at the front part of the cavity 6, remaining strategically located under the narrower end or neck of the article A, so that when said cavity 6 reaches said area in which the lower supporting plane is interrupted, said narrower end of the article A will remain supported by said supporting member 54 and will start its fall through the open bottom of the cavity 6 by the larger end or bottom located at the back part.

It has to be pointed out that, in this example of embodiment, selectively introducing into/withdrawing from the cavity 6 the supporting member 54 depending on the position of the article A within it detected by the system of optic sensors 53a and reflecting surface 53b, does not serve to adapt the cavity 6 to different articles but to determine the correct orientation thereof during the fall. Adapting the cavities 6 to further types of articles is carried out acting on the further supporting members 55. This way, contributing with other detecting systems (not shown) to capture the sizes or the dimensions of the article, in addition to unscrambling their position within the cavity 6 it would be even possible to operation with articles having mixed different sizes.

Referring now to FIGS. 11 to 14, they show an example of alternate embodiment to adapt the cavities to articles A, B having different dimensions. In the example of embodiment shown, the adaptation is carried out between articles A having given dimensions and articles B having smaller dimensions, equal to approximately half the dimensions of the articles A.

On the periphery of said structure 7 (not shown in FIGS. 13 to 16) a plurality of cavities 60 is defined to receive said articles A, B. Each of said cavities 60 is defined by front and back walls 60a, 60b, with respect to the direction of the travel indicated by an arrow, and an external side wall 60d. The cavity 60 comprises in addition a first supporting member 67 arranged close to a front wall 60a and a first stop member 63 arranged close to a back wall 60b, and a side wall 60c, transversally moving which may be brought closer to or taken away from said opposite external side wall 60d. Said first supporting member 67 and first stop member 63, in co-operation with a first position of said moving side wall 60c are adapted for articles A having given dimensions (situation of FIGS. 11 and 13).

The moving side wall 60c comprises a passing opening 66 for a retractable partitioning member 62 which may transversally enter into said cavity 60 to divide it in to equal parts. Close to the back side of said partitioning member 62, there is a further retractable supporting member 68, while close to the front side of said partitioning member 62 there is a further retractable stop member 61 so that with the introduction of said partitioning member 62, further supporting member 68 and further stop members 61, in co-operation with a repositioning of the side wall 60*c*, each of said equal parts remain adapted for articles B having dimensions significantly smaller (situation of FIGS. 12 and 14).

Figure 11:
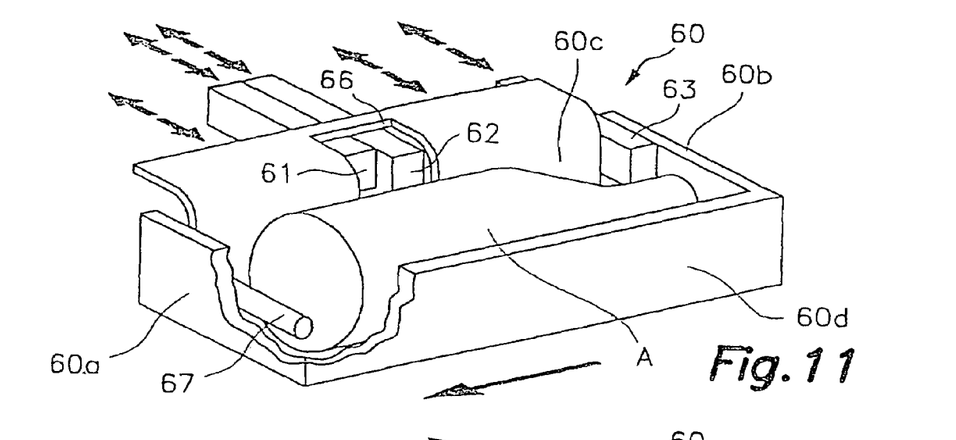
FIG. 11 is a top perspective view which illustrates a hollow body which defines a cavity adapted to articles having given dimensions, said hollow body has available means for partitioning said cavity in equal parts.
Figure 12:
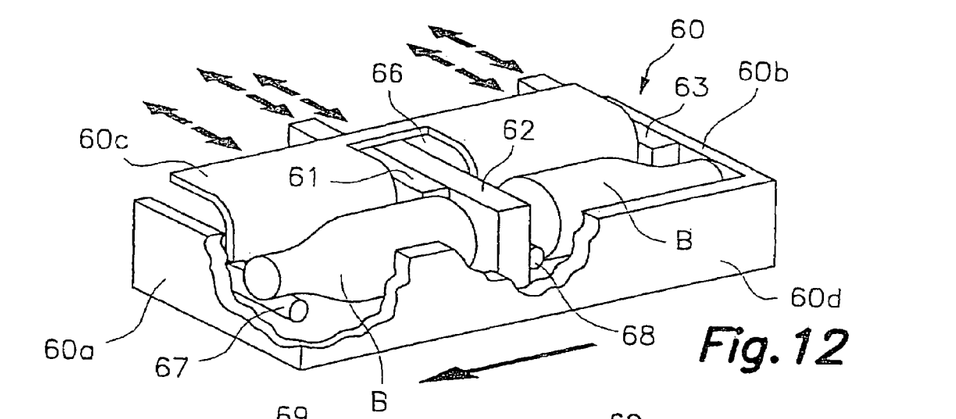
FIG. 12 is a top perspective view which illustrates the hollow body of FIG. 11 divided by said partitioning means in two equal parts adapted to articles having dimensions significantly smaller.
Figures 13, 14:
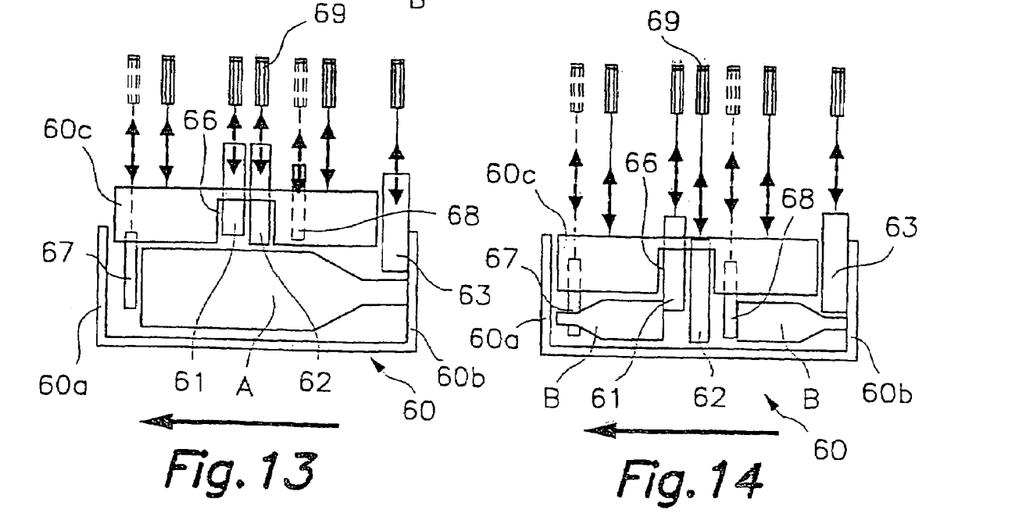
FIGS. 13 and 14 are schematic elevation views which clearer illustrate the situations of the hollow body corresponding to FIGS. 11 and 12, respectively.

The articles A of the cavities 60 of FIGS. 11 and 13 as well as the articles B of the back half of the cavities 60 of FIGS. 12 and 14 have been illustrated with a position in which a narrower end thereof, such as a neck, is directly resting on the back wall 60*b*, so that a larger end of the articles A, B remains outside the supporting members 67, 68, while the articles B of the front half of the cavities 60 of the FIGS. 12 and 14 have been illustrated in a position, randomly inverted, with said larger end resting against the stop members 61, 63 and the narrower ends located on the supporting members 67, 68.

Figures 15, 16:
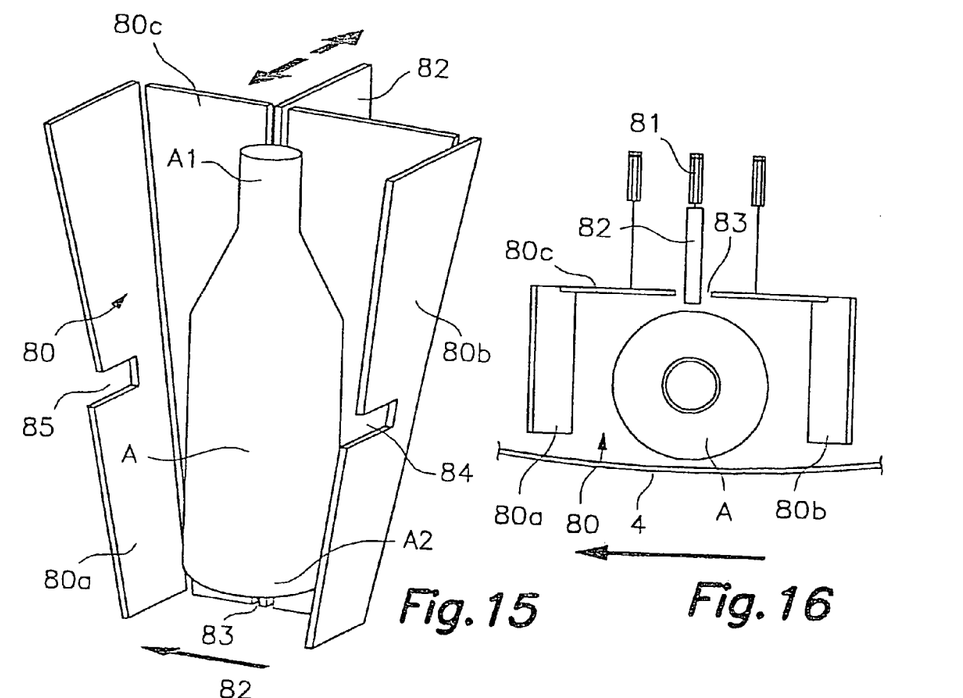
FIG. 15 is a front perspective view which illustrates a chute adapted to articles having given dimensions, said chute having available means for partitioning it in equal parts.
FIG. 16 is a front perspective view which illustrates the chute of FIG. 15 divided by said means for partitioning in two equal parts adapted to articles having significantly smaller dimensions.
Figures 17, 18:
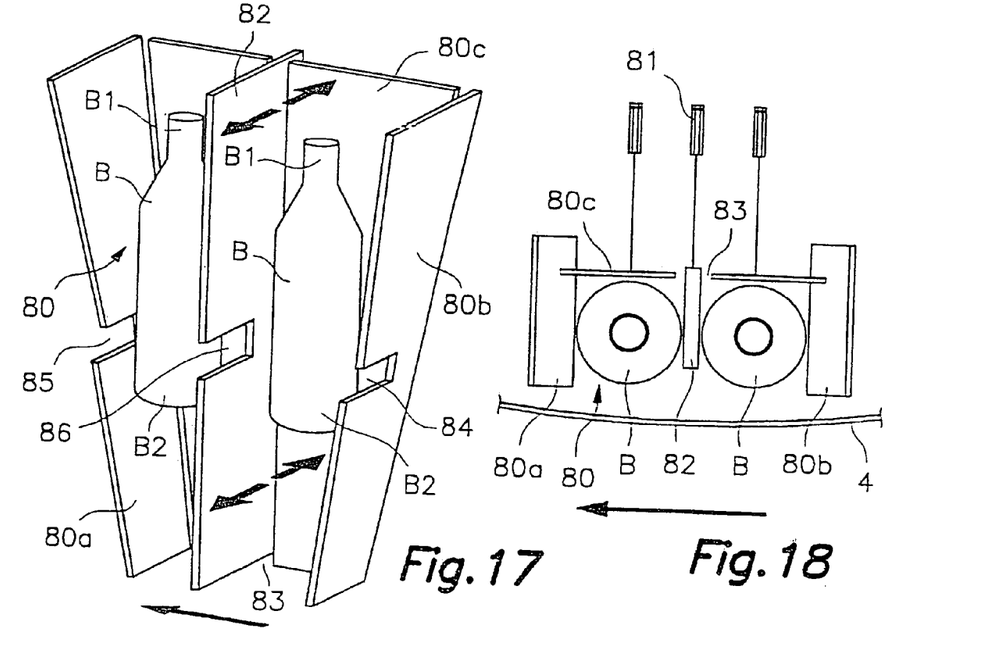
FIGS. 17 and 18 are schematic elevation views which clearer illustrate the situations of the chute corresponding to FIGS. 15 and 16, respectively.

The partition members 62, further supporting members 68, further stop members 61 and side walls 60*c*, are linearly guided and driven by linear actuators of any suitable type, for example, fluid-dynamic cylinders 69 (see FIGS. 13 and 15). Depending on the dimensions of the articles A, B, it could be necessary that said first supporting member 67 and/or said first stop member 63 are also guided and may sustain a slight change of position driven by the linear actuators 69 to complete said adaptation.

The adaptation of the cavities 60 to articles having smaller dimensions by bipartitioning them has the additional advantage that it duplicates the capacity of said collecting means duplicating with it the productivity of the machine.

In a variation not illustrated in the example of embodiment of FIGS. 11 to 14 and implementing for this case the means disclosed with reference to FIGS. 9 and 10, each cavity comprises a first retractable supporting means arranged at the front part, a first system for detecting the position of the articles within the cavity, arranged at the back part and a transversally moving side wall, said first retractable moving mean and said first detecting system being in co-operation with said moving side wall at a given position, adapted for articles (A) having given dimensions. The moving side wall comprises a passage opening for a retractable partition mean, which may transversally enter into said cavity to divide it in two equal parts and for a further retractable supporting member close to the back side of each partition member. A further system for detecting the position may act close to the front part of each partitioning mean. Thus, with the introduction of said partitioning member and further supporting member and with the action of the further detecting system, together with repositioning the moving side wall, each of said equal parts remain adapted for articles B having significantly smaller dimensions. Said detecting systems comprise, for example, optic sensors or visualization devices which cover an area or field close to a back part of the cavity 60 or part of it, to detect when a narrower end, such as a neck, of article A, B is close to a front or back part of said cavity, in the direction of travel, and to release a related signal toward control means in order that they give an order of selective introduction into or withdrawal from the first supporting member and/or further supporting member, individual for each cavity 60, or part of a cavity, depending on the position of the article A, B within it. An example of embodiment of said detecting systems could be the one above described with relation to FIGS. 9 and 10.

These divisible cavities 60 are accompanied by likewise divisible chutes 80, as illustrated in FIGS. 15 to 18. For this, each chute 80 comprises front and back walls 80*a*, 80*b* depending on the rotation direction indicated by an arrow and a moving side wall 80*c* which may be transversally travelling to come nearer or go away from an external side wall formed by a stationary wrapping wall 4 (illustrated in FIGS. 16 and 18). Said front and back walls 80*a*, 80*b* together with a given position of the moving side wall 80*c*, are adapted to collect the articles A having given dimensions. A retractable partitioning member 82 may transversally enter in said chute 80 through an opening 83 of the moving side wall 80*c*, dividing the chute 80 into two equal parts adapted to collect articles B having significantly smaller dimensions.

Although in the examples of embodiment illustrated in FIGS. 11 to 14 and FIGS. 15 to 18, as well as in the other variations disclosed, a single partitioning member is provided to divide each cavity or chute in two equal parts, it could also be feasible to provide, for example two or more partitioning members to divided each cavity or chute into three or more equal parts. However, in theses cases the jump in the order of magnitude between the size of the articles A, which may be handled before partition, and of the articles B, which may be handled after partition, is very significant, therefore it would have a limited application.

The invention claimed is:

1. Automatic adaptable machine for unscrambling and delivering light hollow aligned containers such as plastic bottles, which comprises:

collecting means for said articles (A, B, C), in lying arrangement, which define a plurality of cavities (6, 60) having an opening at its bottom which allows the passage, in fall, of said articles (A, B, C), said cavities (6, 60) are traveling through a closed circuit and are delimited by front and back walls (6*a*, 60*a*, 116*a*, 6*b*, 60*b*, 116*b*, 62) in the direction of the travel and side walls (6*c*, 60*c*, 116*d*, 126*d*, 136*c*, 136*d*), one of said side walls being movable, one or more of said walls integrating or having associated supporting and/or stop configurations (11, 11*a*, 11*b*, 11*c*, 20, 51, 54, 61, 63, 67, 68, 111, 121, 131) of parts of the article (A, B, C) co-operating to confer an upright orientation, having a predetermined direction, to said article (A, B, C) when it falls through said opening at the bottom;

a plurality of chutes (8, 80) to collect in fall and carry the articles (A, B, C), one of said chutes (8, 80) being associated to said opening at the bottom of each cavity (6, 60) traveling together with it along said closed circuit;

supporting means interposed between said bottom opening of each cavity (6, 60) and each respective chute (8, 80) for temporarily retain the articles (A, B, C) in said cavities (6, 60) along a part of the path of said closed circuit, characterized in that at least one of said supporting and/or stop configurations (11*b*, 11*c*, 20, 51, 54, 61, 63, 67, 68, 121, 131) is joined to shifting elements (50, 56, 69) so that it may be introduced into or withdrawn from said cavity (6, 60) recomposing the internal space thereof depending on the dimensions and shapes of a range of articles (A, B, C) to be unscrambled.

2. Machine according to claim 1, characterized in that each of the article collecting chutes (8) and carrying ducts comprises at least two parts (88*a*, 88*b*) which may be for bringing closer or taking away, for adapting them to a thickness or diameter of the article (A, B, C) which has access to them, one of said parts being at least guided and joined to shifting elements (182).

3. Machine according to claim 1, characterized in that the shifts of the supporting configurations (11*b*, 11*c*, 20, 51, 54, 61, 63, 67, 68, 121, 131) or walls (62, 6c, 60c, 126d, 136c, 136d) or parts of walls or combinations thereof are linear and said shiftable means are driven by fluid-dynamic means.

4. Machine, according to claim 1, characterized in that the shifts of the supporting configurations (11b, 11c, 20, 51, 54, 61, 63, 67, 68, 121, 131) or walls (62, 6c, 60c, 126d, 136c, 136d) or parts of the walls, or combinations thereof are linear and said shiftable means are driven by motor driven or electromechanical elements.

5. Machine, according to claim 1, characterized in that it includes means in order that driving shifting elements is simultaneously produced in every cavity (6, 60) and/or chutes (8, 80) upon a manual or automatic command.

6. Machine, according to claim 1 characterized in that it includes means for driving said shifting elements of one or more supporting configurations (54) selectively occurs depending on the characteristics and/or the position of the article (A, B, C) collected in a cavity (6, 60) sensed by detecting means (53a, 53b).

7. Machine, according to claim 1, characterized in that it comprises a receptacle adapted for loading in bulk said articles (A, B, C) with a side wall and a circular bottom on which the articles (A, B, C) are accumulated the bottom of which has a peripheral portion at a distance of said side wall defining an annular space through which the articles (A, B, C) can pass, said collecting means for the articles (A, B, C) being arranged under said passage space to collect said articles (A, B, C).

8. Machine, according to claim 7, characterized in that the cavities (6, 60) defined by said collecting means are longitudinally arranged in a circular periphery of a structure (7) which rotates about an upright or inclined axis, to which structure (7) are also joined the chutes (8).

9. Machines, according to claim 8, characterized in that said collecting means comprise first frame-like or part frame-like hollow bodies (116) secured on said periphery of the structure (7) which defines first cavities adapted to collect a first type of articles (A) and further frame-like or part frame-like hollow bodies (126, 136) which define respective cavities adapted to collect further types of articles (B, C) having decreasing general dimensions, said further bodies (126, 136) are guided and joined to shifting elements so that said bodies (126, 136) adapted to articles (B, C) having smaller dimensions may be introduced into or withdrawn from the cavities of said bodies (116, 126) adapted to articles (A, B) having larger sizes.

10. Machine according to claim 9, characterized in that each body (116, 126, 136) integrates a front wall (116a, 126a, 136a) having a front supporting configuration (111, 121, 131), aback wall (116b, 126b, 136b) having aback supporting and/or stop configuration (110, 120, 130) and an external wall (116d, 126d, 136d), acting as internal wall in said bodies (116, 126) adapted to articles (A, B) having larger dimensions, the external walls (126d, 136d) of said bodies (126, 136) adapted to articles (B, C) having smaller dimensions, except the bodies (136) adapted to the articles (C) having smaller dimensions, which integrate internal walls (136c).

11. Machine, according to claim 8, characterized in that each cavity (6) comprises a supporting configuration (11a) close to said front walls (6a), a moving side wall (6c) having a stop configuration (20) close to said back wall (6b) and several retractable supporting members (11b, 11c) which may be transversally introduced into or withdrawn from the cavity (6) for, in co-operation with the position of said moving wall (6c) adapt each cavity to a range of articles (A, B, C) having decreasing dimensions.

12. Machine according to claim 8, characterized in that it comprises a system for detecting the position in which the article (A) is found within each cavity (6), a retractable supporting member (54) arranged at the front part of each cavity (6) and control means which may direct the drive of said supporting member (54) in order it is transversally introduced into or withdrawn from said front part of the cavity (6) depending on a signal received from said detecting system referring to said position of the article (A) detected.

13. Machine, according to claim 8, characterized in that each cavity (60) comprises a first supporting member (67) arranged at the front part and a first stop member (63) arranged at the back part, adapted for articles (A) having given dimensions, comprising in addition a side wall (60c) transversally moveable with at least one passage opening (66) for at least one retractable partition member (62) which may transversally enter into said cavity (60) for dividing it in at least two equal parts and a further retractable supporting member (68) close to the back side of each partition member (62) and a further retractable stop member (61) close to the front part of each partition member (62) so that with the introduction of said partition members (62), further supporting members (68) and further stop members (61) and by repositioning the side wall (60c), each of said equal parts remain adapted for articles (B) having significantly smaller dimensions.

14. Machine, according to claim 12, characterized in that said detecting system comprises optic sensors (53a, 53b) or visualization devices which cover an area or field close to a back part of the cavity (6) or part thereof.

15. Machine, according to claim 12, characterized in that each chute (80) is adapted to collect articles (A) having given dimensions and comprises at least a retractable partition member (82) which may transversally enter into said chute (80) through an opening (83) of a side wall (80c) dividing the chute (80) into at least two equal parts adapted for collecting articles (B) having smaller dimensions.

* * * * *